UNITED STATES PATENT OFFICE.

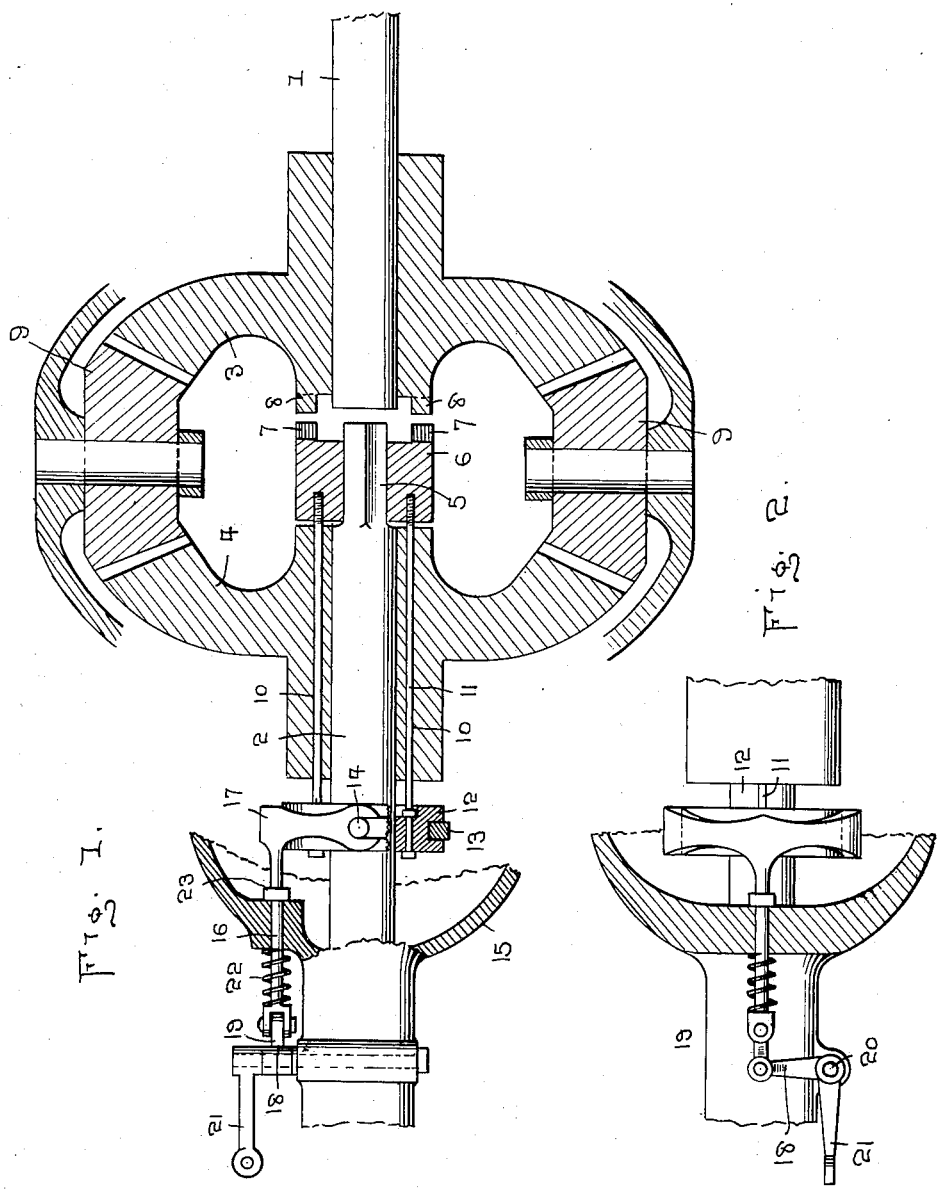

WILLIAM A. BESSERDICH AND BERNHARD A. MOSLING, OF CLINTONVILLE, WISCONSIN.

LOCKING DEVICE FOR DIFFERENTIAL GEARS.

1,111,728.  Specification of Letters Patent.  Patented Sept. 29, 1914.

Application filed March 19, 1913. Serial No. 755,408.

*To all whom it may concern:*

Be it known that we, WILLIAM A. BESSERDICH and BERNHARD A. MOSLING, citizens of the United States, residing at Clintonville, in the county of Waupaca and State of Wisconsin, have invented certain new and useful Improvements in Locking Devices for Differential Gears; and we do hereby declare the following to be a full, clear, and exact description of the invention, such as will enable others skilled in the art to which it appertains to make and use the same.

This invention relates to a locking device for differential gears which is particularly adapted for motor vehicles.

The object of the invention is the provision of a clutch device coöperating with parts of a differential gearing whereby the rear or drive shaft is coupled from wheel to wheel as one solid member.

In the accompanying drawings, Figure 1 represents a view partly in section of our locking device as applied to the differential gearing and rear axle of a motor vehicle, and Fig. 2 is a top plan view of a part of the actuating means for the locking device.

Referring to the drawings, the numerals 1 and 2 represent the two parts of the rear axle of a motor vehicle, or that shaft which is driven from the engine. The adjacent ends of the parts 1 and 2 are provided with the ordinary or any preferred form of differential gears 3 and 4. The end of the shaft 2 is squared as at 5, and slidably receives the clutch member 6 having teeth 7 thereon adapted for engagement with the teeth 8 on the inner end of the hub of the differential gear 3. The pair of differential gears 3 and 4 is meshed with the bevel gears 9 in the usual manner. The differential gear 4 is provided with a plurality of bores 10 extending parallel with the axis of said gear and through which are slidably engaged the connecting rods 11. A ring 12 is slidably mounted over the shaft 2 adjacent the outer end of the hub of the differential gear 4, and is provided with a channel in which is mounted for rotation the ring 13 having the lugs or studs 14 extending radially therefrom. The ring 12 is connected with the clutch member 6 by the connecting rods 11 whereby said parts are moved longitudinally of the shaft 2 simultaneously.

15 indicates a fragment of the housing for the differential and is provided in the upper portion of one end thereof with an aperture through which works an arm 16 carrying a yoke 17 which partially surrounds the ring 12 and engages over the studs 14 on the ring 13. The outer end of the arm 16 is bifurcated and connected with a rocker arm 18 by the link 19. The rocker arm 18 is secured on a shaft 20 journaled in the housing 15, and a crank arm 21 is also secured over said shaft 20.

The clutch member 6 is normally retained disengaged from the teeth 8 of the differential gear 3 by the tension of the spring 22 mounted over the arm 16. A collar 23 is also fitted over said arm 16 to limit the movement thereof and to prevent the escape of oil from the housing or casing 15.

When our invention is employed in connection with motor vehicles, we provide a foot or hand lever on the forward portion of the vehicle adjacent the driver and connect the same with the crank arm 21 in any suitable manner in order that the device will be at all times under the control of the driver. To lock the shafts 1 and 2 together, the crank arm 21 is moved rearwardly and the ring 12 is moved inwardly longitudinally of the shaft 2 engaging the clutch member with the inner end of the hub 3, thus rigidly locking the shafts together.

It will be seen that the invention is particularly adaptable to automobiles, and provides an efficient means for preventing sliding or spinning of one of the drive wheels over a part of a road where there is tread for but one wheel.

What we claim is:—

1. The combination with a two part driven shaft having one of the ends of the parts squared, and differential gears mounted over said parts; of a clutch member mounted over said squared end and adapted for engagement with parts of said differential gears, a ring slidable on one side of the shaft parts, rods connecting said ring with said clutch member, and means for shifting said ring on said shaft part.

2. In a locking device, a two part shaft, a squared end on one of the adjacent ends of the parts of said shaft, a differential gear on the end of the other part of said shaft, teeth on the hub of said gear, a clutch member slidable over said squared end and adapted for engagement with the teeth of the hub of said gear, a ring slidable on one side of the shaft parts, connecting means between said ring and the clutch member, and means for shifting said ring on said shaft part.

In testimony whereof we have signed our names to this specification in the presence of two subscribing witnesses.

WILLIAM A. BESSERDICH.
BERNHARD A. MOSLING.

Witnesses:
LEVI C. LARSON,
CHAS. J. LAUX.